Figure 1:
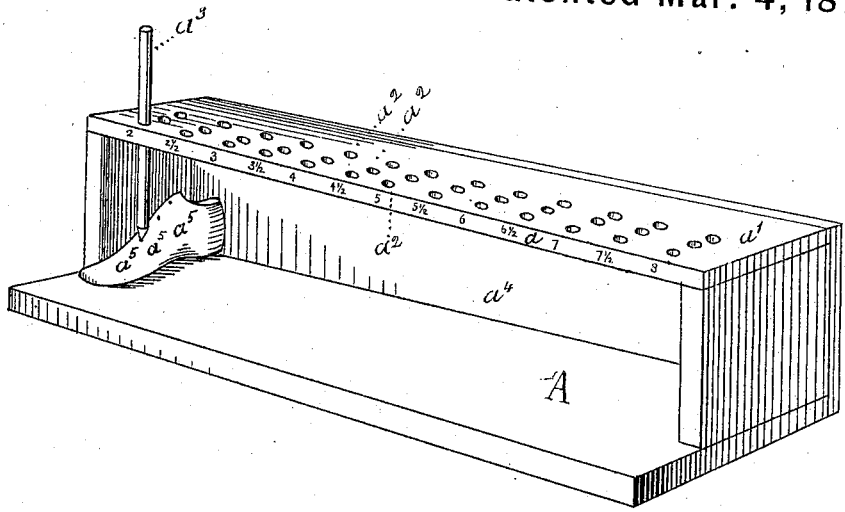

J. KIMBALL.
Guide for Last-Makers.

No. 212,852.  Patented Mar. 4, 1879.

WITNESSES
F. F. Raymond 2d.
A. J. Oettinger.

INVENTOR
John Kimball

UNITED STATES PATENT OFFICE.

JOHN KIMBALL, OF BOSTON, MASSACHUSETTS.

IMPROVEMENT IN GUIDES FOR LAST-MAKERS.

Specification forming part of Letters Patent No. 212,852, dated March 4, 1879; application filed January 10, 1879.

*To all whom it may concern:*

Be it known that I, JOHN KIMBALL, of Boston, in the county of Suffolk and Commonwealth of Massachusetts, have invented an Improved Guide for Last-Makers, Boot and Shoe Manufacturers, Dealers, &c., of which the following is a specification:

This invention relates to the following-described guide for gaging lasts as to their length and fullness, for the establishment of a standard system of last-making.

It is a well-known fact that no uniform standard for the length and fullness of lasts is recognized by the trade, and that generally the lasts are made by the last-maker not from perfect models prepared especially with a view to uniformity, but as the inclination or whim of the manufacturer or last-maker determines. The rule exercised in the manufacture of lasts is, that they shall be graduated in length and fullness with as much regularity as the absence of any recognized system and the lack of a uniform gage will allow.

The most serious trouble arising from this want of uniformity is that which occurs from the variations in the lasts used as models by last-makers. For instance, a manufacturer in giving an order to a last-maker will provide four measurements for each size of last—first, the length; and, second, the dimensions around the last at the instep, waist, and ball.

In the absence of anything to guide him, this allows the model-maker to locate the instep, waist, and ball without much regard for their proper relation to each other or to the heel; or, if the manufacturer furnishes a last or a model with the general instruction that the instep, waist, and ball shall measure a certain number of inches, the model-maker, not having anything to guide him, cannot apply to his model the measurements so that they shall bear the exact relation to each other, and to the heel of the last that they bear in the last from which the measurements were taken. Therefore it is almost impossible for a manufacturer to duplicate orders for lasts unless a correct standard is provided.

My invention is designed to provide a correct gage for last-makers and others, so that lasts can be made to a systematic standard, and each size always have a given length and fullness.

I have ascertained that it is important, as a basis in establishing a uniform system, to provide a standard scale for lengths, in order that the gage hereinafter described may be accurately employed.

In the drawings I have shown the gage embodied in a simple device, of which—

Figure 2:
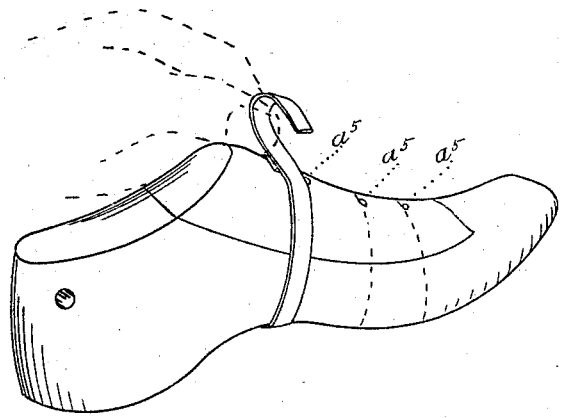

Figure 1 is a perspective view, representing a last in position for measurement. Fig. 2 is a perspective view of a last, illustrating the use of the measuring tape or strap and the instep, waist, and ball indicating marks.

The gage-box A is open along one side, increases in width regularly from one end to the other, is provided with figures indicating the various sizes of lasts, as to their length upon the face $a$ of the upper part or top, $a^1$, with holes $a^2$, having a predetermined relation to each other and to the back of the box, varying for each length in said top $a^1$, and one or more pencils or pins, $a^3$.

As the measurements are determined from the heel of the last, the last or last-block to be gaged is placed in the box on a line with the respective number denominating its length, so that its heel shall abut against the back $a^4$, and its instep, waist, and ball be immediately below and upon a line with the holes $a^2$.

The pin or other marking device is then inserted into the holes and pressed upon the last-block, to indicate thereon the correct position of the instep, waist, and ball, or either, in relation to the heel.

The last or last-block is then removed, and a peg or tack driven therein at the points $a^5$ indicated if they are not sufficiently distinct.

The last-maker then measures with his tape the circumference of the last-block at the instep, waist, and ball, taking the pegs or marks made by the pin or pencil as the points upon the last's surface determining, respectively, the instep, waist, and ball line. If upon applying the tape he ascertains that the last is too full, he removes a portion until the last corresponds in dimensions at the three points named with the measurement required. The model is then correctly shaped, a standard length has been obtained, and a standard gage of three determined points has been attained from which to measure for fullness. Such a last so shaped can be used for a model for any number of duplicates; and in making another model, and by following these directions and using the gage, a standard model or set of lasts will be produced by simply giving to the manufacturer the sizes for length and fullness.

A pin or pencil may be used with each hole, and be supported upon a spring to act in opposition thereto; or a single pin may be employed, in which case it is moved for each mark made.

Other devices may be used for marking these points upon the last; but I prefer to use the one herein described as being the simplest.

As above stated, the essential features necessary to be observed for a uniform standard are, first, a uniform enumeration for lengths; second, the ascertainment of the correct position which the instep, waist, and ball should bear to the heel; third, means for determining upon the last as it is being shaped for a model the correct position of instep, waist, and ball, in order that the last-maker may provide the necessary fullness for the last at the correct points by always measuring from those points.

By following this system, therefore, it is possible to have a correct enumeration for lasts of varying lengths and fullness, which shall always indicate to the person employing it, and shall always produce to the last-manufacturer using it, a last which shall be absolutely in accordance in length and fullness with the dimensions given, and shall be interchangeable with all other lasts of a like enumeration wherever made and by whoever used.

Having thus fully described my invention, I claim and desire to secure by Letters Patent of the United States—

A device for indicating upon a last or last-block the correct position of the instep, waist, and ball in relation to the heel, and in relation to each other or either of them, consisting of a scale for determining the position of these sections, a pin, pencil, or other device used in connection with said scale for marking upon the last or last-block the same, and an indicating-figure or other device for each length of last to which the scale is applied, all substantially as described.

JOHN KIMBALL.

Witnesses:
F. F. RAYMOND, 2d,
GEO. F. WALKER.